(12) United States Patent
Chen et al.

(10) Patent No.: US 8,503,316 B2
(45) Date of Patent: Aug. 6, 2013

(54) METHOD AND APPARATUS FOR HANDLING INCONSISTENT CONTROL INFORMATION IN A WIRELESS COMMUNICATION SYSTEM

(75) Inventors: Wanshi Chen, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 12/722,752

(22) Filed: Mar. 12, 2010

(65) Prior Publication Data

US 2010/0238823 A1   Sep. 23, 2010

Related U.S. Application Data

(60) Provisional application No. 61/160,926, filed on Mar. 17, 2009, provisional application No. 61/160,996, filed on Mar. 17, 2009.

(51) Int. Cl.
*H04W 28/16* (2009.01)

(52) U.S. Cl.
USPC .......................................... 370/252; 370/336

(58) Field of Classification Search
CPC ............................ H04L 1/1822; H04W 72/042
USPC ................................................. 370/235, 252
See application file for complete search history.

(56) References Cited

U.S. PATENT DOCUMENTS

| | | | | |
|---|---|---|---|---|
| 8,107,394 | B2 * | 1/2012 | Kim et al. ...................... | 370/252 |
| 8,112,092 | B2 * | 2/2012 | Yamada et al. ................ | 455/450 |
| 8,116,292 | B2 * | 2/2012 | Terry ............................. | 370/342 |
| 8,144,712 | B2 * | 3/2012 | Love et al. .................. | 370/310.1 |
| 2007/0230350 | A1 * | 10/2007 | Heo et al. ...................... | 370/235 |

(Continued)

FOREIGN PATENT DOCUMENTS

| | | |
|---|---|---|
| EP | 1708523 A1 | 10/2006 |
| RU | 2262194 C2 | 10/2005 |

OTHER PUBLICATIONS

International Search Report and Written Opinion—PCT/US2010/027427, International Search Authority—European Patent Office Jul. 26, 2010.

(Continued)

*Primary Examiner* — Ricky Ngo
*Assistant Examiner* — Ben H Liu
(74) *Attorney, Agent, or Firm* — Peng Zhu

(57) ABSTRACT

Techniques for handling inconsistent control information in a wireless communication system are described. In an aspect, inconsistent control information is handled in different manners for the downlink and uplink. In one design, a user equipment (UE) receives a first grant with first control information for a first data transmission and also receives a second grant with second control information for a second data transmission. The UE determines that the second control information is inconsistent with the first control information, e.g., due to the two grants conveying different transport block sizes. The UE determines whether to retain or discard the second grant based on whether the two grants are for data transmissions on the downlink or uplink. In one design, the UE retains the second grant if the two grants are for data transmissions on the downlink and discards the second grant if the two grants are for data transmissions on the uplink.

30 Claims, 4 Drawing Sheets

U.S. PATENT DOCUMENTS

| | | | |
|---|---|---|---|
| 2008/0019327 A1 | 1/2008 | Kwon et al. | |
| 2008/0254804 A1* | 10/2008 | Lohr et al. | 455/442 |
| 2009/0257385 A1* | 10/2009 | Meylan et al. | 370/329 |
| 2009/0268693 A1* | 10/2009 | Lindh et al. | 370/336 |
| 2010/0034152 A1* | 2/2010 | Imamura | 370/329 |
| 2010/0061361 A1* | 3/2010 | Wu | 370/350 |
| 2010/0182968 A1* | 7/2010 | Ojala et al. | 370/329 |
| 2010/0329220 A1* | 12/2010 | Kim et al. | 370/336 |

OTHER PUBLICATIONS

Qualcomm Europe et al: "Clarify latest and initial PDCCH for PDSCH and PUSCH transmisi sons" 3GPP DRAFT; RI-091651 36.213 Clarifying Initial and Latest PDCCH for DL and UL, SRD Generation Partnership Project (3GPP), Mobile Competence Centre, no. Seoul, Korea; 20090328, Mar. 28, 2009, XP050339186.

Qualcomm Europe et al: "Clarify some parameters for determining control resources on PUSCH" 3GPP DRAFT; RI-091650 36.212 Clarifying Initial and Latest PDCCH for DL and UL, 3RD Generation Partnership Project (3GPP), Mobile Competence Centre ;, [Online] Mar. 28, 2009, XP002586570 Sophia-Antipolis Cedex ; France 3GPP Website Retrieved from the Internet: URL:http://www.3gpp.org/ftp/tsg_ran/WGI_RL I/TSGRI_56b/Docs/RI-091650.zip>.

Qualcomm Europe: "On Handling Inconsistent Control Information" 3GPP Proposal; RI-091441, 3RD Generation Partnership Project (3GPP).

Mobile Competence Centre ;, [Online] Mar. 27, 2009, XP002586569 Sophia-Antipolis Cedex ; France 3GPP Website Retrieved from the Internet: URL:http://www.3gpp.org/ftp/tsg_ran/WGI_RL I/TS6RI_56b/Docs/RI-091441.zip>.

3GPP TS 36.213, "3rd Generation Partnership Project; Technical Specification Group Radio Access Network; Evolved Universal Terrestrial Radio Access (E-UTRA); Physical layer procedures (Release 8)", (Mar. 2009), section 7.1.6, p. 22, section 7.1.7.2, p. 26, section 8.1, p. 55, section 8.6.2, p. 61, V8.6.0.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 8)", (Dec. 2008), section 5.3.2.2, p. 19, section 5.4.2.2, p. 22, V8.4.0.

* cited by examiner

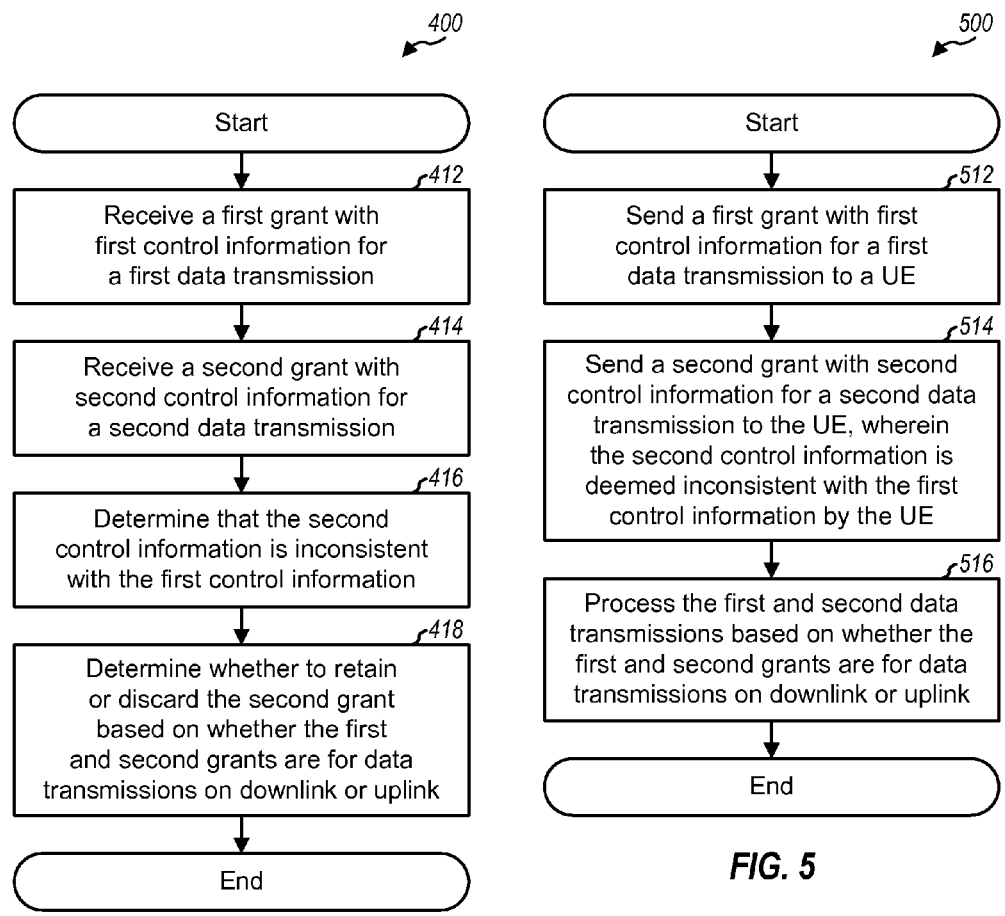

METHOD AND APPARATUS FOR HANDLING INCONSISTENT CONTROL INFORMATION IN A WIRELESS COMMUNICATION SYSTEM

The present application claims priority to provisional U.S. Application Ser. No. 61/160,926, entitled "METHOD AND APPARATUS FOR HANDLING INCONSISTENT CONTROL INFORMATION IN LTE," and provisional U.S. Application Ser. No. 61/160,996, entitled "METHOD AND APPARATUS FOR HANDLING INCONSISTENT CONTROL INFORMATION IN LTE," both filed Mar. 17, 2009 and incorporated herein by reference.

BACKGROUND

I. Field

The present disclosure relates generally to communication, and more specifically to techniques for communicating in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may send control information and data to a UE. The control information may convey various parameters used for data transmission. The UE may receive the control information and may process the data transmission based on the control information to recover the data sent by the base station. It may be desirable for the UE to interpret the control information from the base station.

SUMMARY

Techniques for handling inconsistent control information in a wireless communication system are described herein. In an aspect, inconsistent control information may be handled in different manners for the downlink and uplink. In one design, a UE may receive a first grant with first control information for a first data transmission and may thereafter receive a second grant with second control information for a second data transmission. The UE may determine that the second control information is inconsistent with the first control information. In one design, the first control information may convey a first transport block size, and the second control information may convey a second transport block size. The UE may deem that the second control information is inconsistent with the first control information due to the second transport block size being different from the first transport block size. The UE may determine whether to retain or discard the second grant based on whether the first and second grants are for data transmissions on the downlink or uplink.

In one design, the UE may retain the second grant if the first and second grants are for data transmissions on the downlink. The first and second grants may be two most recent grants for a transport block. Different transport block sizes may be allowed for different data transmissions of the transport block. The UE may compare a subsequent grant for the transport block against the second/latest grant to detect for inconsistent control information.

In one design, the UE may discard the second grant if the first and second grants are for data transmissions on the uplink. The first grant may be an initial grant for a transport block, and the second grant may be the most recent grant for the transport block. A single transport block size may be allowed for different data transmissions of the transport block. The UE may compare a subsequent grant for the transport block against the first/initial grant to detect for inconsistent control information.

Inconsistent control information may also be detected and handled in other manners, as described below. A base station may perform processing in a manner to account for the handling of inconsistent control information by the UE, as also described below. Various aspects and features of the disclosure are described in further detail below.

BRIEF DESCRIPTION OF THE DRAWINGS

FIG. 4 shows a process for receiving control information.
FIG. 5 shows a process for sending control information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
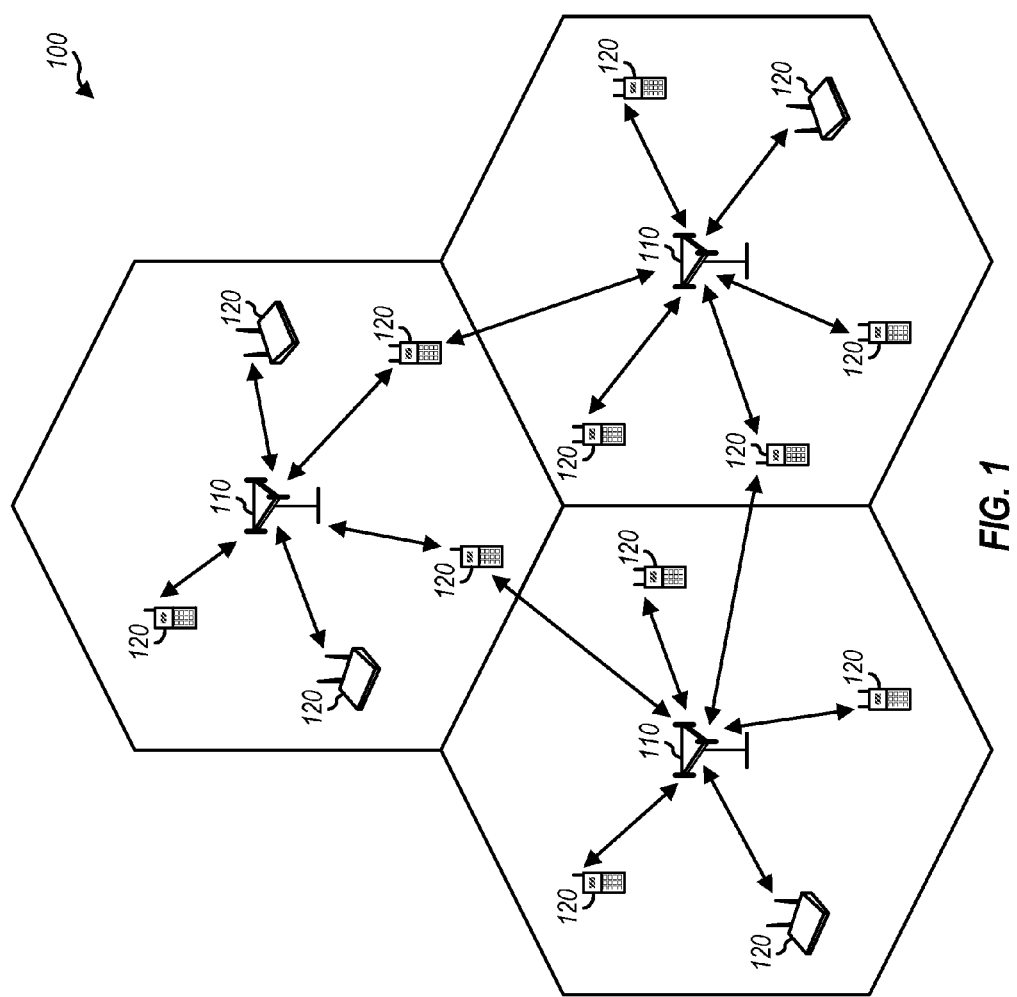
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with UEs and may also be referred to as a Node B, a base station, an access point, etc. Each eNB 110 may provide communication coverage for a particular geographic area and may support communication for UEs located within the coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The system may support HARQ in order to improve reliability of data transmission and support rate adaptation for varying channel conditions. For HARQ, a transmitter may send a transmission of a transport block and may send one or more additional transmissions, if needed, until the transport block is decoded correctly by a receiver, or the maximum number of transmissions has been sent, or some other termination condition is encountered. A transport block may also be referred to as a packet, a codeword, etc. A transmission of a transport block may also be referred to as an HARQ transmission, a data transmission, etc.

Figure 2:
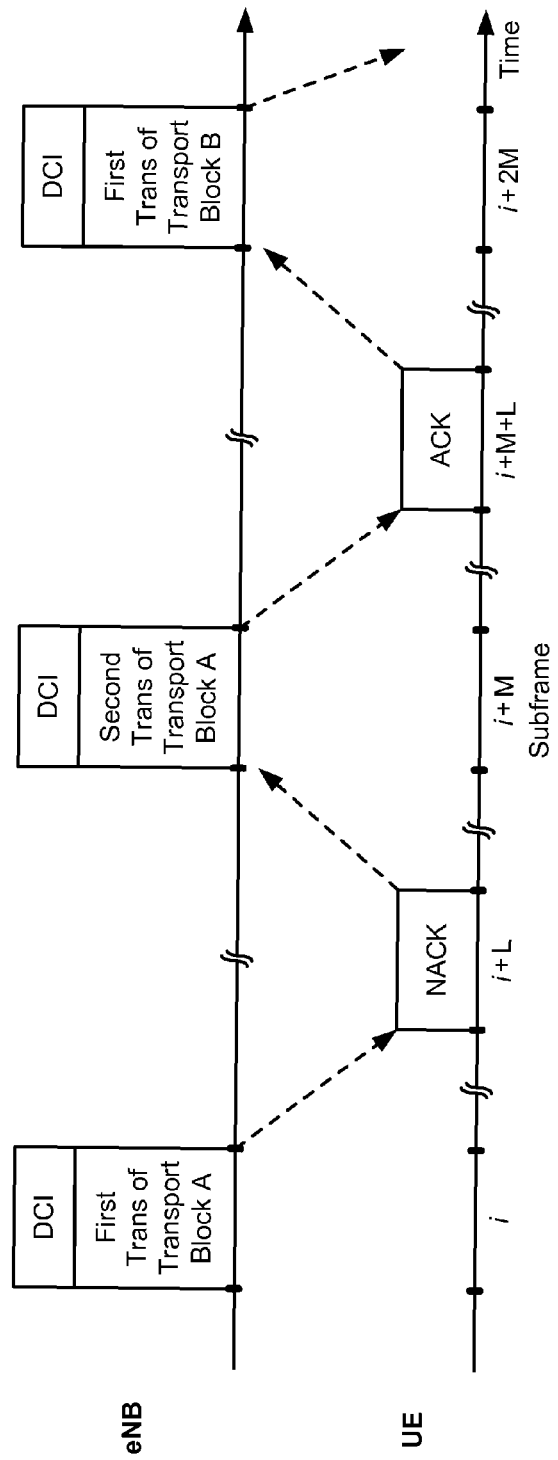
FIG. 2 shows data transmission with hybrid automatic retransmission (HARQ).

FIG. 2 shows an example of sending data transmissions on the downlink with HARQ. The transmission timeline may be partitioned into units of subframes. Each subframe may cover a predetermined time duration, e.g., 1 milliseconds (ms) in LTE.

In the example shown in FIG. 2, an eNB may have data to send to a UE and may process a transport block A based on a transport format to obtain data symbols. The transport format may be associated with a modulation and coding scheme (MCS), a transport block (TB) size, and/or other parameters for the transport block. The MCS may be associated with a modulation scheme/order, a code rate, etc. The eNB may send downlink control information (DCI) on a Physical Downlink Control Channel (PDCCH) and a first transmission of transport block A on a Physical Downlink Shared Channel (PDSCH) to the UE in subframe i. The DCI may convey various parameters for the first transmission, as described below.

The UE may receive the DCI and the first transmission of transport block A from the eNB and may process the first transmission based on the DCI. The UE may decode transport block A in error and may send a negative acknowledgement (NACK) in subframe, where L is an HARQ feedback delay and may be equal to 2, 3, 4, etc. The eNB may receive the NACK and may send new DCI on the PDCCH and a second transmission of transport block A on the PDSCH in subframe i+L, where M may be equal to 4, 6, 8, etc. The UE may receive the DCI and the second transmission of transport block A from the eNB and may process the first and second transmissions based on the DCI. The UE may decode transport block A correctly and may send an acknowledgement (ACK) in subframe i+M+L. The eNB may receive the ACK and may then process and send another transport block B in similar manner.

The system may support a number of HARQ processes. Each HARQ process may or may not be active at any given moment, and one or more transport blocks may be sent in each active HARQ process. One or more new transport blocks may be sent on an HARQ process upon termination of one or more transport blocks being sent on the HARQ process.

The system may support synchronous HARQ and/or asynchronous HARQ. For synchronous HARQ, transmissions of a transport block may be sent in subframes that are known a priori by a transmitter and a receiver. For asynchronous HARQ, transmissions of a transport block may be scheduled and sent in any subframes. The techniques described herein may be used for both synchronous HARQ and asynchronous HARQ.

As shown in FIG. 2, the eNB may send DCI with each transmission of a transport block to the UE. The DCI for a given transmission of the transport block may include a PDCCH grant for the UE. The terms "grant" and "assignment" are often used interchangeably. The PDCCH grant may include a New Data Indicator (NDI), an MCS index, resource allocation information, etc. The NDI may be toggled for the first transmission of a transport block and may be maintained at the same value for each subsequent transmission of the transport block. (For semi-persistent scheduling, the NDI may be set to '0' for a new transport block or to '1' for another transmission of a current transport block.) The resource allocation information may indicate the number of resource blocks assigned to the UE for the transmission of the transport block. For LTE, the MCS index may be a 5-bit value within a range of 0 to 31. Each MCS index value within a range of 0 to 28 may be associated with a specific modulation order and a specific TBS index value. The TB size of the transport block may be determined based on the TBS index value and the number of assigned resource blocks. Each MCS index value within a range of 29 to 31 may be associated with a specific modulation order for the downlink or a specific redundancy version for the uplink, but no TBS index value. The TB size for an MCS index within the range of 29 to 31 may be equal to the TB size of either the latest PDCCH grant or the initial PDCCH grant for the same transport block, which should include an MCS index within the range of 0 to 28. (The difference between the latest and initial PDCCH grants is described below.) The TB size may thus be (i) explicitly conveyed by an MCS index within the range of 0 to 28 or (ii) implicitly conveyed by an MCS index within the range of 29 to 31. The DCI may also include other parameters for the transmission of the transport block. For example, the DCI may include an HARQ process ID for data transmission on the downlink, an aperiodic channel quality indicator (CQI) request on the uplink, etc.

The UE may receive and process a transmission of a transport block based on DCI sent with the transmission. The UE may determine whether the transmission is for a new transport block or a current transport block based on whether or not the NDI is toggled. The UE may maintain a buffer to store soft symbols or log-likelihood ratios (LLRs) for the transport block and may decode the transport block based on the soft symbols. The UE may (i) clear the buffer for a new transport block if the NDI is toggled and (ii) retain the buffer and use the soft symbols in the buffer for decoding the current transport block if the NDI is not toggled. The UE may determine the TB size of the transport block based on the MCS index and the resource allocation for the transmission. The UE may also obtain other parameters from the DCI and may process the transmission based on the DCI.

The UE may receive inconsistent control information, which may be defined in various manners. In one design, control information may be deemed as inconsistent if multiple PDCCH grants for the same transport block indicate different TB sizes. In another design, control information may be deemed as inconsistent if multiple PDCCH grants indicate different values for a given parameter. In yet another design, control information may be deemed as inconsistent if a value for a parameter is not one of a set of allowed values for the parameter. For example, the number of assigned resource blocks may be restricted to be an integer multiple of 2, 3 or 5. In this case, a PDCCH grant with 7 assigned resource blocks would be deemed as including inconsistent control information. Inconsistent control information may also be defined in other manners.

Figure 3:
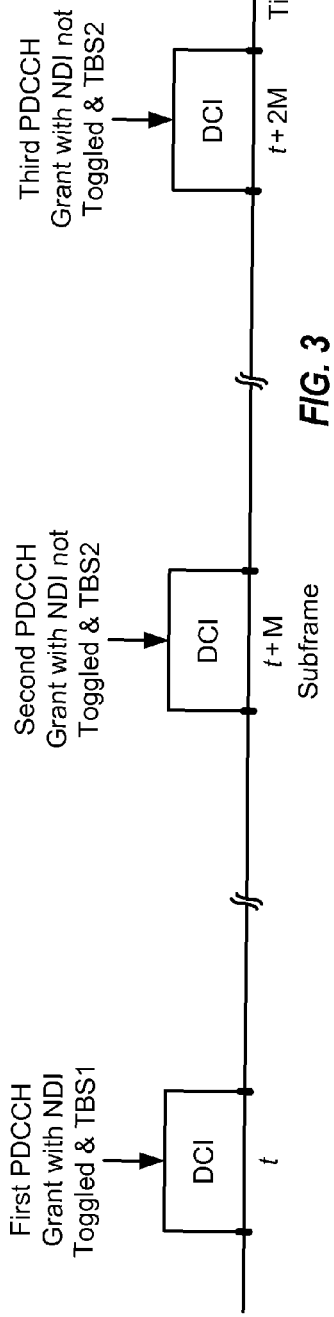
FIG. 3 shows an example of a UE receiving inconsistent control information.

FIG. 3 shows an example of the UE receiving inconsistent control information. In the example shown in FIG. 3, the UE receives a first PDCCH grant for a given HARQ process with the NDI toggled and a first TB size of TBS1 in subframe t. The UE receives a second PDCCH grant for the same HARQ process with the NDI not toggled and a second TB size of TBS2 in subframe t+M. The second TB size is different from the first TB size. The UE receives a third PDCCH grant for the same HARQ process with the NDI not toggled and the second TB size of TBS2 in subframe t+2M.

As shown in FIG. 3, the UE receives three PDCCH grants for the same H-ARQ process. These PDCCH grants may be (i) downlink assignments for data transmission on the downlink to the UE or (ii) uplink assignments for data transmission on the uplink by the UE. Since the NDI is toggled for only the first PDCCH grant in subframe t and is not toggled in subsequent PDCCH grants in subframes t+M and t+2M, the UE interprets the three PDCCH grants in subframes t, t+M and t+2M as being for three transmissions of the same transport block. In general, a PDCCH grant when the NDI is toggled and all subsequent PDCCH grants with the NDI not toggled may be considered to be PDCCH grants for the same transport block. However, the TB sizes for the three PDCCH grants in FIG. 3 are inconsistent. In particular, the first PDCCH grant indicates a TB size of TBS1 whereas the two subsequent PDCCH grants indicate a TB size of TBS2, which is not equal to TBS1.

In general, the UE may receive inconsistent control information for data transmission on the downlink and/or inconsistent control information for data transmission on the uplink. Inconsistent control information for data transmission for each link may be defined by multiple PDCCH grants for the same transport block indicating different TB sizes. Inconsistent control information may be handled in various manners.

In a first scheme for handling inconsistent control information, different interpretations may be used for inconsistent control information for the downlink and uplink. In one design, inconsistent control information for the downlink may be retained whereas inconsistent control information for the uplink may be discarded. For the downlink, retaining the inconsistent control information may entail keeping the PDCCH grant with the inconsistent control information and possibly clearing the buffer at the UE, so that soft symbols for a new transport block can replace soft symbols for an old transport block. This behavior may be desirable for the downlink since the eNB may have traffic information, quality-of-service (QoS) information, and queue information for the data to send to the UE. Hence, it may be better for the UE to follow the most recent PDCCH grant from the eNB. For the uplink, discarding the inconsistent control information may entail discarding the PDCCH grant with the inconsistent control information and reverting to a valid PDCCH grant. This behavior may be desirable for the uplink since the eNB may not have sufficient information regarding the data to send by the UE. Furthermore, the inconsistent control information may be due to decoding error at the UE.

For the first scheme, a transport block sent on the downlink may have one or more TB sizes. For the example shown in FIG. 3, both the second and third PDCCH grants would be considered as valid assignments. The second TB size of TBS2 would replace the first TB size of TBS1 for the second and third transmissions of the transport block in subframes t+M and t+2M, respectively. For a given PDCCH grant, if the MCS index is within the range of 0 to 28, then the TB size of the transport block may be determined based on the MCS index and the number of assigned resource blocks, as described above. If the MCS index is within the range of 29 to 31, then the TB size may be determined based on the latest PDCCH grant for the same transport block with an MCS index within the range of 0 to 28.

For the first scheme, a transport block sent on the uplink may have only one TB size. For the example shown in FIG. 3, both the second and third PDCCH grants would be discarded. In one design, the first PDCCH grant and the first TB size of TBS1 may be used for the second and third transmissions of the transport block sent in subframes t+M and t+2M, respectively. The TB size for each transmission of the transport block may be determined based on the TB size in the first/initial PDCCH grant for the transport block since any inconsistent TB size for the transport block would be discarded. For a given PDCCH grant, if the MCS index is within the range of 0 to 28, then the TB size of the transport block may be determined based on the MCS index and the number of assigned resource blocks, as described above. If the MCS index is within the range of 29 to 31, then the TB size may be determined based on the initial PDCCH grant for the same transport block with an MCS index within the range of 0 to 28. In another design, transmission on the uplink may be skipped for each PDCCH grant with inconsistent control information.

The behavior of the UE for retaining inconsistent control information for the downlink and discarding inconsistent control information for the uplink is described in further detail below.

In a second scheme, inconsistent control information for both the downlink and uplink may be discarded. Inconsistent control information may result from different TB sizes in multiple PDCCH grants for the same transport block. Discarding the inconsistent control information may entail discarding the PDCCH grant with the inconsistent control information and reverting to a valid PDCCH grant. For the example shown in FIG. 3, the second PDCCH grant in subframe t+M may be discarded by the UE since the second TB size is not equal to the first TB size. For the downlink, the UE may retain the buffer of soft symbols obtained from prior transmissions of the transport block. For the uplink, the UE may skip sending a transmission of the transport block in subframe t+M. This behavior for the uplink may also be applicable for the first scheme.

For the second scheme, a PDCCH grant may be discarded if it includes control information that is deemed to be inconsistent. The discarded PDCCH grant would not be used for future reference. Instead, the initial PDCCH grant may be used as a reference against which later PDCCH grants for the same transport block are compared. For the example shown in FIG. 3, the UE may compare the third PDCCH grant received in subframe t+2M against the first PDCCH grant received in subframe t since the second PDCCH grant is discarded. In this example, the UE would also discard the third PDCCH grant since it includes inconsistent control information in comparison to the first PDCCH grant in subframe t (due to the TB size for the third PDCCH grant being different from the TB size for the first PDCCH grant).

For the uplink, the UE may correctly receive the first PDCCH grant and may obtain the TB size of TBS1. The UE may then send a transmission of a transport block with a size of TBS1 for the first PDCCH grant. Alternatively, the UE may miss the first PDCCH grant but may correctly receive the second PDCCH grant and obtain the TB size of TBS2. In this case, the UE may send no transmission for the first PDCCH grant but may send a transmission of a transport block with a size of TBS2 for the second PDCCH grant. The eNB may perform blind decoding/detection and may attempt to decode the transmission from the UE based on different TB sizes of TBS1 and TBS2. This behavior for the uplink may also be applicable for the first scheme.

In a third scheme, inconsistent control information for both the downlink and uplink may be retained. Retaining the inconsistent control information may entail keeping and using the PDCCH grant with the inconsistent control information. For the third scheme, a transport block may have different TB sizes. For the example shown in FIG. 3, the UE may retain the second PDCCH grant received in subframe t+M even though the second TB size is not equal to the first TB size. For the downlink, the UE may process the second transmission of the transport block based on the second PDCCH grant. For the uplink, the UE may replace a current protocol data unit (PDU) built based on the first TB size of TBS1 with a new PDU built based on the second TB size of TBS2. The UE may continue to update or retain other H-ARQ parameters, which should not be impacted by the inconsistent control information. For example, the UE may continue to increment (instead of reset) a CURRENT_TX_NB parameter indicative of the number of transmissions sent for the transport block. Similarly, the UE may retain the third PDCCH grant received in subframe t+2M.

For both the downlink and uplink, the UE may receive a PDCCH grant with an MCS index within the range of 0 to 28 and may determine the TB size based on the MCS index and the number of assigned resource blocks. The UE may also receive a PDCCH grant with an MCS index within a range of 29 to 31 and may determine the TB size based on the latest PDCCH grant for the same transport block with an MCS index within the range of 0 to 28. For the example shown in FIG. 3, the second PDCCH grant in subframe t+M may include an MCS index within the range of 0 to 28 to convey the second TB size of TBS2. If the third PDCCH grant in subframe t+2M includes an MCS index within the range of 29 to 31, then the second TB size of TBS2 from the second PDCCH grant may be used for the third transmission of the transport block in subframe t+2M. This behavior may be applicable for the first scheme.

The UE may correctly receive the second PDCCH grant and may obtain the second TB size, which may be indicated by an MCS index within the range of 0 to 28. The third PDCCH grant may include an MCS index within the range of 29 to 31, and the UE may then use the second TB size from the second PDCCH grant for the same transport block. However, if the UE missed the second PDCCH grant but correctly received the third PDCCH grant with an MCS index within the range of 29 to 31, then the UE may use the first TB size from the first PDCCH grant. The UE may thus use different TB sizes for the third transmission depending on whether the second PDCCH grant is received correctly or in error. The eNB may perform blind decoding for the transmissions from the UE for different TB sizes to account for PDCCH grants being missed by the UE.

In a fourth scheme, inconsistent control information for both the downlink and uplink may be avoided by specifying no changes to parameters of interest for PDCCH grants of the same transport block. For example, the TB size may be specified to be the same for all PDCCH grants for the same NDI in the same H-ARQ process. This may avoid different TB sizes due to eNB scheduling. The eNB may send PDCCH grants with the same TB size, but the UE may receive different TB sizes due to decoding error. As a result, the first, second or third scheme described above may be used to deal with different TB sizes received by the UE.

Table 1 summarizes the four schemes described above for handling inconsistent control information.

TABLE 1

Schemes for Handling Inconsistent Control Information

| Scheme | Description | TB Size Restriction |
|---|---|---|
| First Scheme | Retain downlink (DL) grants with inconsistent control information, and | For DL, a transport block can have different TB sizes |
| | Discard uplink (UL) grants with inconsistent control information | For UL, a transport block can have only one TB size |
| Second Scheme | Discard DL and UL grants with inconsistent control information | A transport block can have only one TB size |
| Third Scheme | Retain DL and UL grants with inconsistent control information | A transport block can have different TB sizes |
| Fourth Scheme | Use the first, second or third scheme to handle inconsistent control information, e.g., due to decoding error at UE | Forbid different TB sizes for the same transport block |

The UE may receive a PDCCH grant with an MCS index within the range of 29 to 31. If inconsistent control information is retained, then the UE may determine the TB size for the current PDCCH grant based on the latest PDCCH grant for the same transport block with an MCS index within the range of 0 to 28. If inconsistent control information is discarded, then the UE may determine the TB size for the current PDCCH grant based on the initial PDCCH grant for the same transport block, which should have an MCS index within the range of 0 to 28. The above behavior may be applicable for both the downlink and uplink.

FIG. 4 shows a design of a process 400 for receiving control information in a wireless communication system. Process 400 may be performed by a UE (as described below) or by some other entity. The UE may receive a first grant with first control information for a first data transmission (block 412). The UE may thereafter receive a second grant with second control information for a second data transmission (block 414). The UE may receive the first and second grants in different time intervals, e.g., different subframes. The UE may determine that the second control information is inconsistent with the first control information (block 416). The UE may determine whether to retain or discard the second grant based on whether the first and second grants are for data transmissions on the downlink or uplink (block 418). The UE may also determine whether to retain or discard the second grant based further on whether the first and second grants are for the same transport block, which may be determined based on NDI and HARQ process ID sent in each grant. The H-ARQ process ID may be explicitly indicated (e.g., for a downlink grant) or implicitly indicated (e.g., for an uplink grant).

In one design of block 416, the first control information may comprise a first value for a parameter, and the second control information may comprise a second value for the parameter. The second control information may be deemed to be inconsistent with the first control information due to the second value being different from the first value. In another design, the first control information may comprise a first transport block size, and the second control information may comprise a second transport block size. The second control information may be deemed to be inconsistent with the first control information due to the second transport block size being different from the first transport block size. Inconsistent control information may also be determined in other manners.

For the first scheme described above, the UE may retain the second grant in block 418 if the first and second grants are for data transmissions on the downlink. The first and second grants may be two most recent grants for a transport block. Different transport block sizes may be allowed for different data transmissions of the transport block. The UE may compare a subsequent grant for the transport block against the second/latest grant to detect for inconsistent control information. The second grant may not convey an explicit transport block size for a transport block. For example, the second grant may include an MCS index within the range of 29 to 31. The UE may determine a transport block size for the second data transmission based on the latest grant for the transport block with an explicit transport block size, e.g., with an MCS index within the range of 0 to 28.

For the first scheme described above, the UE may discard the second grant in block 418 if the first and second grants are for data transmissions on the uplink. The first grant may be an initial grant for a transport block, and the second grant may be the most recent grant for the transport block. A single transport block size may be allowed for different data transmissions of the transport block. The UE may compare a subsequent grant for the transport block against the first/initial grant to detect for inconsistent control information. The initial grant may convey an explicit transport block size, e.g., may have an MCS index within the range of 0 to 28. The second grant may not convey an explicit transport block size, e.g., may have an MCS index within the range of 29 to 31. The UE may determine a transport block size for the second data transmission based on the explicit transport block size in the initial grant.

The UE may also retain or discard the second grant in other manners. For example, the UE may retain or discard the second grant based on the second, third, or fourth scheme described above.

In one design, the first and second grants may be for data transmissions on the downlink. The UE may receive and process the first data transmission based on the first control information. The UE may also receive and process the second data transmission based on the second control information. In another design, the first and second grants may be for data transmissions on the uplink. The UE may send the first data transmission based on the first control information. The UE may skip sending the second data transmission due to the second control information being inconsistent with the first control information. Alternatively, the UE may send the second data transmission based on the first control information.

FIG. 5 shows a design of a process 500 for sending control information in a wireless communication system. Process 500 may be performed by a base station/eNB (as described below) or by some other entity. The base station may send a first grant with first control information for a first data transmission to a UE (block 512). The base station may also send a second grant with second control information for a second data transmission to the UE (block 514). The second control information may be deemed to be inconsistent with the first control information by the UE. For example, the first control information may comprise a first transport block size, and the second control information may comprise a second transport block size. The second control information may be deemed to be inconsistent with the first control information by the UE due to the second transport block size being different from the first transport block size.

The base station may process the first and second data transmissions based on whether the first and second grants are for data transmissions on the downlink or uplink (block 516). In one design, the first and second grants may be for data transmissions on the downlink. The base station may send the first data transmission based on the first control information and may send the second data transmission based on the second control information. In another design, the first and second grants may be for data transmissions on the uplink. The base station may receive and process the first data transmission based on the first control information and may also receive and process the second data transmission based on the second control information. The base station may perform blind decoding for the second data transmission if decoding error is obtained for the second data transmission when it is processed based on the second control information.

Figure 6:
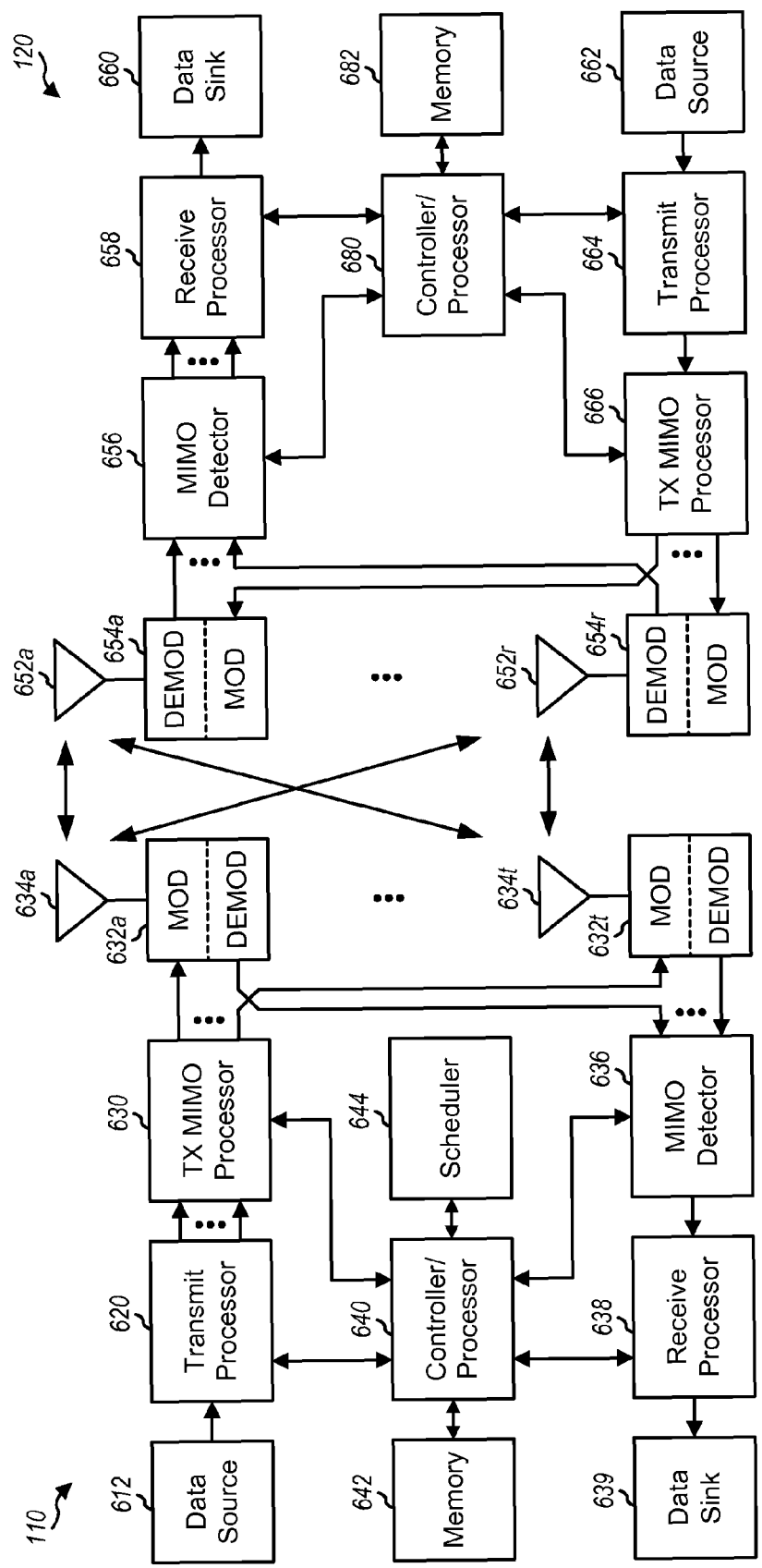
FIG. 6 shows a block diagram of a base station and a UE.

FIG. 6 shows a block diagram of a design of a base station/eNB 110 and a UE 120, which may be one of the base stations/eNBs and one of the UEs in FIG. 1. Base station 110 may be equipped with T antennas 634a through 634t, and UE 120 may be equipped with R antennas 652a through 652r, where in general $T \geq 1$ and $R \geq 1$.

At base station 110, a transmit processor 620 may receive data for one or more UEs from a data source 612 and control information (e.g., PDCCH grants) from a controller/processor 640. Processor 620 may process (e.g., encode, interleave, and modulate) the data and control information to obtain data symbols and control symbols, respectively. A transmit (TX) multiple-input multiple-output (MIMO) processor 630 may perform spatial processing (e.g., precoding) on the data symbols, the control symbols, and/or reference symbols, if applicable, and may provide T output symbol streams to T modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At UE 120, antennas 652a through 652r may receive the downlink signals from base station 110 and may provide received signals to demodulators (DEMODs) 654a through 654r, respectively. Each demodulator 654 may condition (e.g., filter, amplify, downconvert, and digitize) its received signal to obtain input samples. Each demodulator 654 may further process the input samples (e.g., for OFDM, etc.) to obtain received symbols. A MIMO detector 656 may obtain received symbols from all R demodulators 654a through 654r, perform MIMO detection on the received symbols if applicable, and provide detected symbols. A receive processor 658 may process (e.g., demodulate, deinterleave, and decode) the detected symbols, provide decoded data for UE 120 to a data sink 660, and provide decoded control information to a controller/processor 680.

On the uplink, at UE 120, a transmit processor 664 may receive and process data from a data source 662 and control information from controller/processor 680. The symbols from transmit processor 664 may be precoded by a TX MIMO processor 666 if applicable, further processed by modulators 654a through 654r (e.g., for SC-FDM, etc.), and transmitted to base station 110. At base station 110, the uplink signals from UE 120 may be received by antennas 634, processed by demodulators 632, detected by a MIMO detector 636 if applicable, and further processed by a receive processor 638 to obtain decoded data and control information sent by UE 120. Processor 638 may provide the decoded data to a data sink 639 and the decoded control information to controller/processor 640.

Controllers/processors 640 and 680 may direct the operation at base station 110 and UE 120, respectively. Processor 640 and/or other processors and modules at base station 110 may perform or direct process 500 in FIG. 5 and/or other processes for the techniques described herein. Processor 680 and/or other processors and modules at UE 120 may perform or direct process 400 in FIG. 4 and/or other processes for the techniques described herein. Memories 642 and 682 may store data and program codes for base station 110 and UE 120, respectively. A scheduler 644 may schedule UEs for data transmission on the downlink and/or uplink.

In one configuration, apparatus 110 for wireless communication may include means for sending a first grant with first control information for a first data transmission to a UE, means for sending a second grant with second control information for a second data transmission to the UE, and means for processing the first and second data transmissions based on whether the first and second grants are for data transmissions on the downlink or uplink. The aforementioned means may be processor(s) 620, 638 and/or 640 configured to perform the functions recited by the aforementioned means. The aforementioned means may also be a module or any apparatus configured to perform the functions recited by the aforementioned means.

In another configuration, apparatus 120 for wireless communication may include means for receiving a first grant with first control information for a first data transmission, means for receiving a second grant with second control information for a second data transmission, means for determining that the second control information is inconsistent with the first control information, and means for determining whether to retain or discard the second grant based on whether the first and second grants are for data transmissions on the downlink or uplink. The aforementioned means may be processor(s) 658 and/or 680 configured to perform the functions recited by the aforementioned means. The aforementioned means may also be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving a first grant with first control information for a first uplink data transmission of a first transport block;
receiving a second grant with second control information for a second uplink data transmission of the first transport block;
receiving a third grant for a first downlink data transmission of a second transport block, the third grant indicating a third transport block size for the second transport block;
receiving a fourth grant for a second downlink data transmission of the second transport block, the fourth grant indicating a fourth transport block size for the second transport block, the fourth transport block size different from the third transport block size;
determining that the second control information is inconsistent with the first control information;
discarding the second grant for the second uplink data transmission based on the determination that the second control information is inconsistent with the first control information; and
retaining the fourth grant for the second downlink data transmission of the second transport block.

2. The method of claim 1, wherein the first control information comprises a first value for a parameter, and the second control information comprises a second value for the parameter, and wherein the second control information is deemed to be inconsistent with the first control information due to the second value being different from the first value.

3. The method of claim 1, wherein the first control information comprises a first transport block size, and the second control information comprises a second transport block size, and wherein the second control information is deemed to be inconsistent with the first control information due to the second transport block size being different from the first transport block size.

4. The method of claim 1, wherein the fourth grant does not convey an explicit transport block size for the second transport block, the method further comprising:
determining a transport block size for the second downlink data transmission based on a latest grant for the second transport block with an explicit transport block size.

5. The method of claim 1, wherein the first grant is an initial grant for the first transport block, wherein the second grant is a most recent grant for the first transport block, and wherein a subsequent grant for a third uplink data transmission of the first transport block is compared against the first grant to detect for inconsistent control information.

6. The method of claim 1, wherein a single transport block size is allowed for different uplink data transmissions of a same transport block.

7. The method of claim 5, wherein the initial grant conveys an explicit transport block size and the subsequent grant does not convey an explicit transport block size, the method further comprising:
determining a transport block size for the third uplink data transmission of the first transport block based on the explicit transport block size in the initial grant.

8. The method of claim 1, further comprising:
receiving and processing the first downlink data transmission of the second transport block based on the third grant;
storing first soft symbols associated with the first downlink data transmission of the second transport block in a data buffer;
receiving and processing the second downlink data transmission based on the fourth grant; and
replacing the first soft symbols in the data buffer with second soft symbols associated with the second downlink data transmission of the second transport block.

9. The method of claim 1, further comprising:
sending the first uplink data transmission based on the first control information; and
not sending the second uplink data transmission due to the second control information being inconsistent with the first control information.

10. An apparatus for wireless communication, comprising:
means for receiving a first grant with first control information for a first uplink data transmission of a first transport block;
means for receiving a second grant with second control information for a second uplink data transmission of the first transport block;
means for receiving a third grant for a first downlink data transmission of a second transport block, the third grant indicating a third transport block size for the second transport block;
means for receiving a fourth grant for a second downlink data transmission of the second transport block, the fourth grant indicating a fourth transport block size for the second transport block, the fourth transport block size different from the third transport block size;
means for determining that the second control information is inconsistent with the first control information;
means for discarding the second grant for the second uplink data transmission based on the determination that the second control information is inconsistent with the first control information; and
means for retaining the fourth grant for the second downlink data transmission of the second transport block.

11. The apparatus of claim 10, wherein the first control information comprises a first transport block size, and the second control information comprises a second transport block size, and wherein the second control information is deemed to be inconsistent with the first control information due to the second transport block size being different from the first transport block size.

12. The apparatus of claim 10, wherein the first grant is an initial grant for the first transport block, wherein the second grant is a most recent grant for the first transport block, and wherein a subsequent grant for a third uplink data transmission of the first transport block is compared against the first grant to detect for inconsistent control information.

13. An apparatus for wireless communication, comprising:
at least one processor configured to receive a first grant with first control information for a first uplink data transmission of a transport block, to receive a second grant with second control information for a second uplink data transmission of the first transport block, to receive a third grant for a first downlink data transmission of a second transport block, the third grant indicating a third transport block size for the second transport block, to receive a fourth grant for a second downlink data transmission of the second transport block, the fourth grant indicating a fourth transport block size for the second transport block, the fourth transport block size different from the third transport block size, to determine that the second control information is inconsistent with the first control information, to discard the second grant for the second uplink data transmission based on the determination that the second control information is inconsistent with the first control information, and to retain the fourth grant for the second downlink data transmission of the second transport block.

14. The apparatus of claim 13, wherein the first control information comprises a first transport block size, and the second control information comprises a second transport block size, and wherein the second control information is deemed to be inconsistent with the first control information due to the second transport block size being different from the first transport block size.

15. The apparatus of claim 13, wherein the first grant is an initial grant for the first transport block, wherein the second grant is a most recent grant for the first transport block, and wherein a subsequent grant for a third uplink data transmission of the first transport block is compared against the first grant to detect for inconsistent control information.

16. A computer program product, comprising:
a non-transitory computer-readable medium comprising:
code for causing at least one processor to receive a first grant with first control information for a first uplink data transmission of a first transport block,
code for causing the at least one processor to receive a second grant with second control information for a second uplink data transmission of the first transport block,
code for causing the at least one processor to receive a third grant for a first downlink data transmission of a second transport block, the third grant indicating a third transport block size for the second transport block,
code for causing the at least one processor to receive a fourth grant for a second downlink data transmission of the second transport block, the fourth grant indicating a fourth transport block size for the second transport block, the fourth transport block size different from the third transport block size,
code for causing the at least one processor to determine that the second control information is inconsistent with the first control information,
code for causing the at least one processor to discard the second grant for the second uplink data transmission based on the determination that the second control information is inconsistent with the first control information, and
code for causing the at least one processor to retain the fourth grant for the second downlink data transmission of the second transport block.

17. The computer program product of claim 16, wherein the first control information comprises a first transport block size, and the second control information comprises a second transport block size, and wherein the second control information is deemed to be inconsistent with the first control information due to the second transport block size being different from the first transport block size.

18. The computer program product of claim 16, wherein the first grant is an initial grant for the first transport block, wherein the second grant is a most recent grant for the first transport block, and wherein a subsequent grant for a third uplink data transmission of the transport block is compared against the first grant to detect for inconsistent control information.

19. A method for wireless communication, comprising:
sending a first grant with first control information for a first uplink data transmission of a first transport block to a user equipment (UE);
sending any subsequent grants with second control information for subsequent uplink data transmissions of the first transport block to the UE, wherein the second control information is consistent with the first control information;
processing the first and second uplink data transmissions based on the first and second control information;
sending a third grant for a first downlink data transmission of a second transport block, the third grant indicating a third transport block size for the second transport block;
sending the first downlink data transmission of the second transport block according to the third grant;
sending a fourth grant for a second downlink data transmission of the second transport block, the fourth grant indicating a fourth transport block size for the second transport block, the fourth transport block size different from the third transport block size; and
sending the second downlink data transmission of the second transport block according to the fourth grant.

20. The method of claim 19, wherein the first control information comprises a first transport block size, and the second control information comprises a second transport block size, and wherein the second transport block size and the first transport block size are a consistent transport block size.

21. The method of claim 19, wherein the processing the first and second data transmissions comprises
receiving and processing the first uplink data transmission based on the first control information;
receiving and processing the subsequent uplink data transmissions based on the second control information; and
performing blind decoding for the subsequent uplink data transmissions if decoding error is obtained for the subsequent uplink data transmissions.

22. An apparatus for wireless communication, comprising:
means for sending a first grant with first control information for a first uplink data transmission of a first transport block to a user equipment (UE);
means for sending any subsequent grants with second control information for subsequent uplink data transmissions of the first transport block to the UE, wherein the second control information is consistent with the first control information;
means for processing the first and second uplink data transmissions based on the first and second control information;
means for sending a third grant for a first downlink data transmission of a second transport block, the third grant indicating a third transport block size for the second transport block;
means for sending the first downlink data transmission of the second transport block according to the third grant;
means for sending a fourth grant for a second downlink data transmission of the second transport block, the fourth grant indicating a fourth transport block size for the second transport block, the fourth transport block size different from the third transport block size; and
means for sending the second downlink data transmission of the second transport block according to the fourth grant.

23. The apparatus of claim 22, wherein the first control information comprises a first transport block size, the second control information comprises a second transport block size, and wherein the second transport block size and the first transport block size are a consistent transport block size.

24. The apparatus of claim 22, wherein the means for processing the first and second data transmissions comprises
means for receiving and processing the first uplink data transmission based on the first control information;

means for receiving and processing the subsequent uplink data transmissions based on the second control information; and means for performing blind decoding for the subsequent uplink data transmissions if decoding error is obtained for the subsequent uplink data transmissions.

25. An apparatus for wireless communication, comprising:
at least one processor configured to send a first grant with first control information for a first uplink data transmission of a first transport block to a user equipment (UE), to send any subsequent grants with second control information for subsequent uplink data transmissions of the first transport block to the UE, wherein the second control information is consistent with the first control information, to process the first and second uplink data transmissions based on the first and second control information, to send a third grant for a first downlink data transmission of a second transport block, the third grant indicating a third transport block size for the second transport block, to send the first downlink data transmission of the second transport block according to the third grant, to send a fourth grant for a second downlink data transmission of the second transport block, the fourth grant indicating a fourth transport block size for the second transport block, the fourth transport block size different from the third transport block size, and to send the second downlink data transmission of the second transport block according to the fourth grant.

26. The apparatus of claim 25, wherein the first control information comprises a first transport block size, the second control information comprises a second transport block size, and wherein the second transport block size and the first transport block size are a consistent transport block size.

27. The apparatus of claim 25, wherein the at least one processor is configured to receive and process the first uplink data transmission based on the first control information, to receive and process the subsequent uplink data transmissions based on the second control information, and to perform blind decoding for the subsequent uplink data transmissions if decoding error is obtained for the subsequent uplink data transmissions.

28. A computer program product, comprising:
a non-transitory computer-readable medium comprising:
code for causing at least one processor to send a first grant with first control information for a first uplink data transmission of a first transport block to a user equipment (UE), code for causing the at least one processor to send any subsequent grants with second control information for subsequent uplink data transmissions of the first transport block to the UE, wherein the second control information is consistent with the first control information, and code for causing the at least one processor to process the first and second uplink data transmissions based on the first and second control information, code for causing the at least one processor to send a third grant for a first downlink data transmission of a second transport block, the third grant indicating a third transport block size for the second transport block, code for causing the at least one processor to send the first downlink data transmission of the second transport block according to the third grant, code for causing the at least one processor to send a fourth grant for a second downlink data transmission of the second transport block, the fourth grant indicating a fourth transport block size for the second transport block, the fourth transport block size different from the third transport block size, and code for causing the at least one processor to send the second downlink data transmission of the second transport block according to the fourth grant.

29. The computer program product of claim 28, wherein the first control information comprises a first transport block size, and the second control information comprises a second transport block size, and wherein the second transport block size and the first transport block size are a consistent transport block size.

30. The computer program product of claim 28, the non-transitory computer-readable medium further comprising:
code for causing the at least one processor to receive and process the first uplink data transmission based on the first control information, code for causing the at least one processor to receive and process the subsequent uplink data transmissions based on the second control information, and code for causing the at least one processor to perform blind decoding for the subsequent uplink data transmissions if decoding error is obtained for the subsequent uplink data transmissions.

* * * * *